Figure 1:
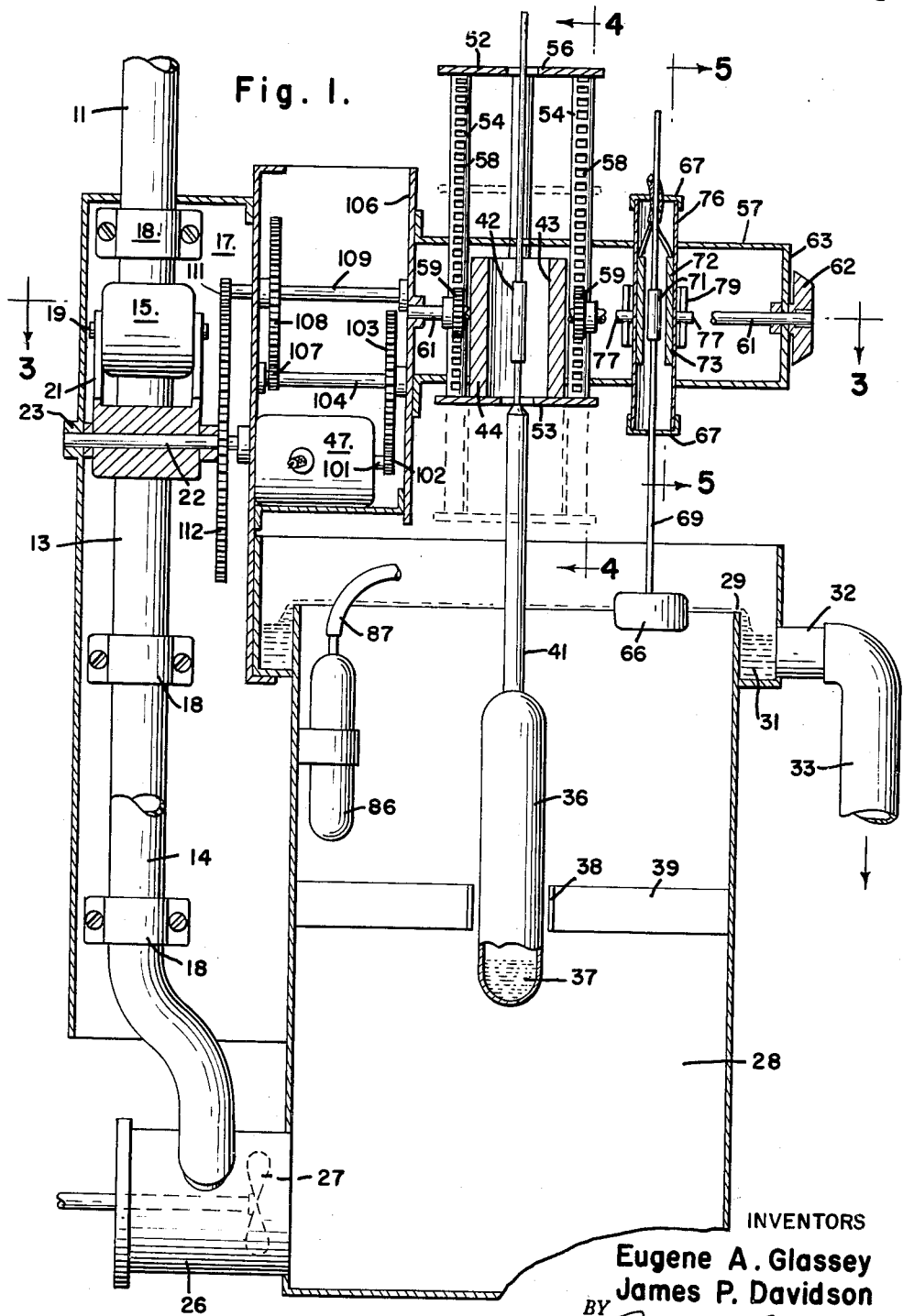

May 14, 1963  J. P. DAVIDSON ETAL  3,089,502
DENSITY CONTROL APPARATUS
Filed July 18, 1960  4 Sheets-Sheet 1

INVENTORS
Eugene A. Glassey
James P. Davidson
BY Julian Caplan
attorney

May 14, 1963 J. P. DAVIDSON ETAL 3,089,502
DENSITY CONTROL APPARATUS
Filed July 18, 1960 4 Sheets-Sheet 3

INVENTORS
Eugene A. Glassey
James P. Davidson
BY
Julian Caplan
attorney

May 14, 1963 J. P. DAVIDSON ETAL 3,089,502
DENSITY CONTROL APPARATUS
Filed July 18, 1960 4 Sheets-Sheet 4
Fig. 5.
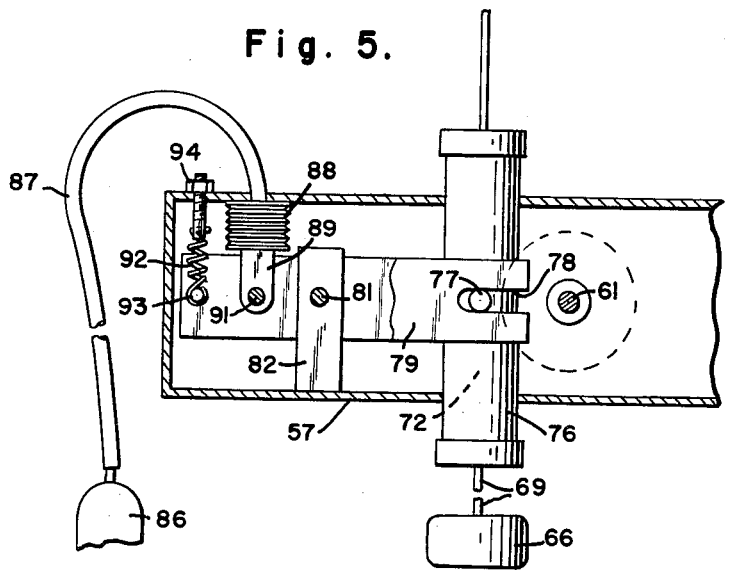
Fig. 6.
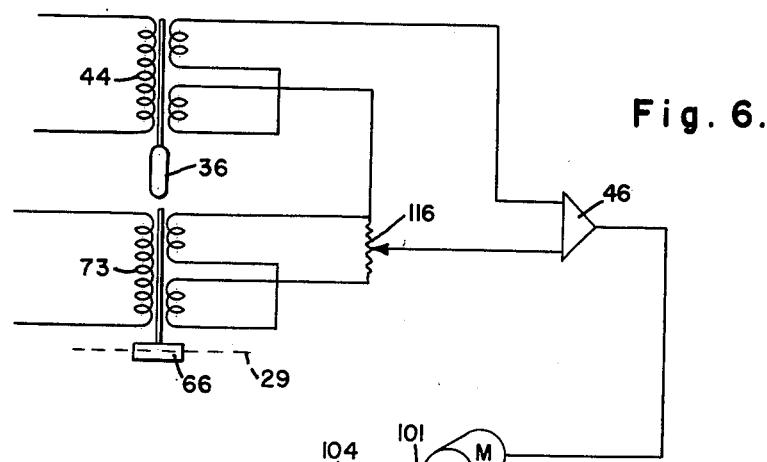
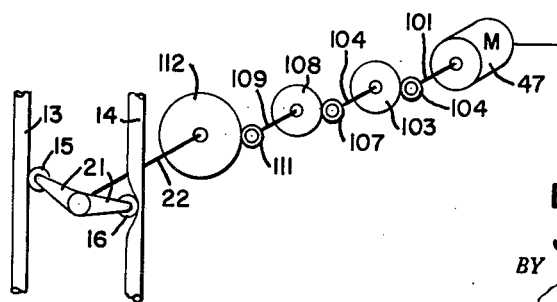
INVENTORS
Eugene A. Glassey
James P. Davidson
BY U### United States Patent Office 3,089,502
Patented May 14, 1963

3,089,502
DENSITY CONTROL APPARATUS
James P. Davidson, 198 Montclaire Way, and Eugene A. Glassey, 5545 Eva Ave., both of Los Altos, Calif.
Filed July 18, 1960, Ser. No. 43,431
17 Claims. (Cl. 137—90)

This invention relates to a new and improved density control apparatus. More particularly the present invention relates to an apparatus employing a hydrometer bulb floating in the liquid to be controlled and which has a magnetic core slidable within the coils of a differential transformer, the differential transformer being electrically connected to drive a servomotor controlling the flow of two liquids through inlet lines in such manner that variation in the density of the liquid under control causes adjustment of the valve openings in the intake lines to restore the liquid to a predetermined density. Additional features of the invention reside in the provision of automatic compensation means for variations in the quantity of flow of the liquid under test over a weir and for fluctuations in the temperature of the liquid under test.

A particular feature and advantage of the invention is the convenient control which the apparatus provides whereby the density of the liquid may be directly controlled at the point in the fluid line immediately behind the point of mixing of two liquids of different densities.

A further feature of the invention is the provision of means whereby the density may be adjusted from time to time when operating conditions make a more or less dense liquid desirable.

A particular adaptation of the present invention is in cannery practice and more specifically in the adjustment of the sugar content in syrups filled into cans. From time to time as the growing season progresses, the sugar content of the fruit changes and a more or less sweet syrup is required. It is, of course, well recognized that the density of the syrup is a measure of the sugar content thereof and accordingly density measurements by means of a hydrometer are conventional in cannery practice. Heretofore such density control has been accomplished by measuring by means of a hydrometer the density of the contents of a tank discharging into the filler bowl of a can filling machine and then manually adjusting the flow of sugar solution or water entering the tank until the desired density is obtained. The present invention provides automatic means for securing such control.

Accordingly, a principal feature and advantage of the invention is the adjustment of density which is accomplished automatically and without the requirement of close attention by an operator and which is substantially continuous in that as conditions may tend to change the proper adjustment of the valves in the fluid lines is changed almost instantaneously.

It will be understood that although the present invention may be used to advantage in connection with control of syrups, the same apparatus may be used to control the density of many other fluids such as brine solution, paints and the like where a relatively dense and a relatively non-dense liquid are mixed together at a preferred combined density.

Further advantage of the invention resides in the fact that automatic compensation is provided for flow conditions. It will be understood that the reading of a hydrometer in a sense of its absolute elevation depends to a considerable extent upon the rate of flow of the fluid through the container in which the hydrometer is floating. Thus as hereinafter described in detail, the fluid under test flows over the edge of a test vessel, the edge of the vessel comprising in effect a weir. The height of fluid above the top edge of the weir is a function of the rate of flow of the fluid and hence the height of the hydrometer bulb is likewise a function of the rate of flow. The present invention employs compensating means which makes the density control for practical purposes independent of the rate of flow.

Still another feature of the invention is the provision of temperature compensation. It will be understood that density is a function of temperature. Under many operating conditions the ambient temperature or product temperature may fluctuate greatly during the day. For example, in canneries the temperature at the commencement of operations may be 60° F. and may rise as high as 120° F. Since density is roughly a linear function of the temperature, compensating means may be incorporated in the present invention to give a proper control regardless of the variations in temperature.

A further feature and advantage of the present invention is the fact that the hydrometer is suspended in the fluid at a point adjacent the point of mixing of the two fluids and directly in the stream of the liquid rather than in a container which merely samples a portion of the flow of fluid. Hence a more accurate reading is obtained and further the reading is more promptly responsive to any change in the rate of flow of the two fluids or their respective densities.

Still another feature of the invention is the extremely close control obtained. Thus in accordance with this invention a control as low as $\frac{1}{12}$ Brix accuracy may be attained and held substantially constant through an entire day's operation. When from time to time the Brix reading must be changed to adjust for such matters as the flavor of the fruist passing through the filling line, such adjustment may be made merely by turning a properly calibrated dial.

A particular advantage of the present invention is the fact that there is no direct mechanical transmission of the hydrometer elevation to the valve control means, but on the contrary the valves are opened and closed by means of a servo-motor which is in turn controlled by a differential transformer, the armature of which is connected to and responsive to the height of the hydrometer bulb.

Still another feature of the invention is the fact that the flow lines are controlled by valves having no mechanical parts inside the line. Thus as hereinafter appears the flow line is preferably a plastic hose which may be clamped by means of clamp rollers, thereby controlling the flow through the pipes. This feature of the invention makes the valves peculiarly free from maintenance problems due to sticking of the valves by coagulation of the material flowing therethrough and also eliminates the sanitation problem which otherwise occurs in flow lines having mechanical valves, particularly where food products are involved.

Other objects of the present invention will become apparent upon reading the following specification and referring to the accompanying drawings in which similar characters of reference represent corresponding parts in each of the several views.

Figure 2:
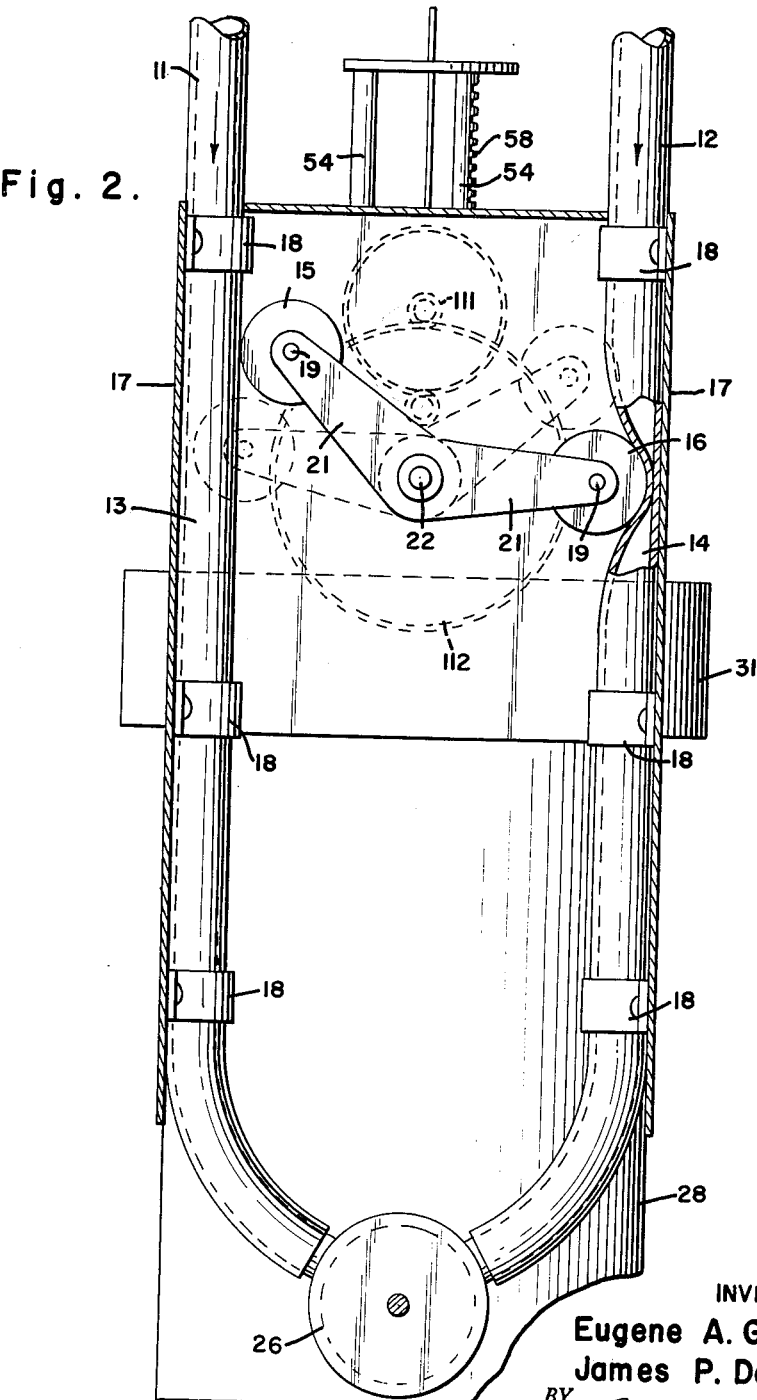
Figure 3:
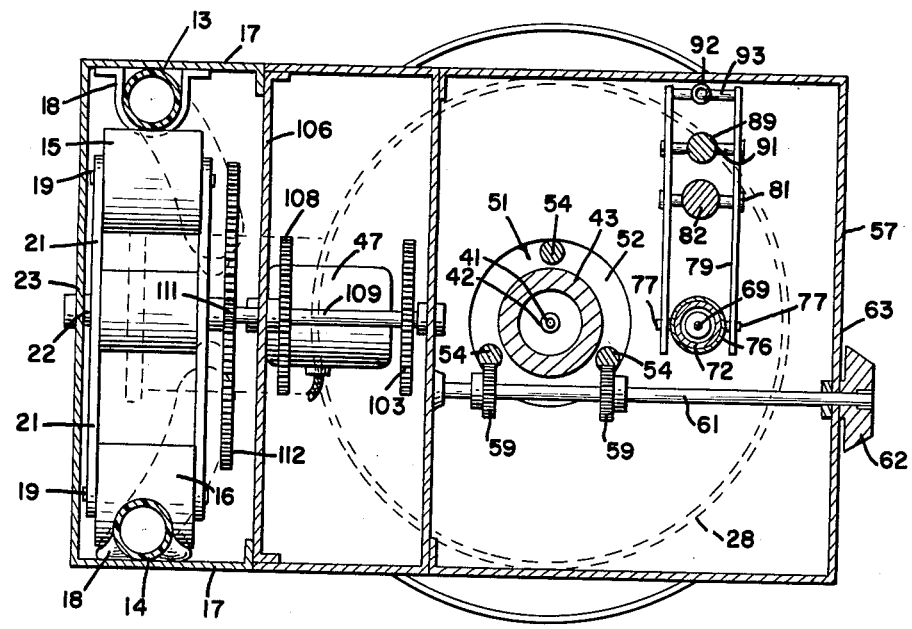
Figure 4:
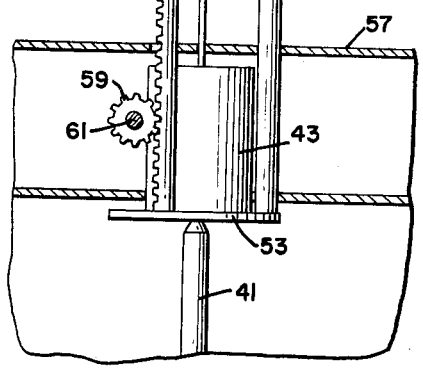

In the drawings:
FIG. 1 is a vertical sectional view through the apparatus.
FIG. 2 is a side elevation as viewed from the left in FIG. 1.
FIG. 3 is a transverse sectional view substantially along the line 3—3 of FIG. 1.
FIG. 4 is a fragmentary sectional view taken substantially along the line 4—4 of FIG. 1.
FIG. 5 is a fragmentary sectional view taken substantially along the line 5—5 of FIG. 1.
FIG. 6 is a schematic wiring diagram also incorporating therein a portion of the valve control mechanism.

The present invention is adaptable to control of density of a wide variety of products. For purpose of illustration it will be assumed that the present invention is employed to control the density of sugar syrups of the type used in canneries. Mixture of such sugar syrup is accomplished by adding water to a high sugar content fluid and mixing the water and high content sugar to produce a homogenous syrup of the desired density. The mixed syrup is then discharged into the filler bowl of a can filling machine and then filled into cans of fruit or the like. Various conditions may fluctuate and affect the desired sugar content of the liquid discharged into the filler bowl. For example, the sugar content of the high sugar fluid may vary, there may be variations in the pressure of the fluid in either the water or high sugar content line, the rate of flow required to keep the filler bowl at the desired level may change and the temperature may vary during the day. In addition, the desired density of the mixed syrup may change depending upon the particular product being packed or its degree of ripeness or the like. Adjustment may be made to bring the density and hence the sugar content to the desired level. Similarly when other liquids are being controlled, operating conditions may be subject to similar variation, all of which are taken into account in the invention hereinafter described.

The apparatus hereinafter described uses a first fluid inlet line 11 and a second fluid inlet line 12, such as a line for high density sugar solution and for water, respectively. Inserted in each such line is a plastic tube 13, 14, respectively, which is relatively flexible and compressible. Mounted and controlled by means hereinafter described in detail adjacent each plastic tube section is a pinch roller 15, 16, respectively, and opposite each pinch roller is a compression plate 17. Clamps 18 hold the tubing 13, 14 in position against the compression plates 17 and accordingly as the pinch roller 15, 16 moves toward or away from plate 17 the flow of fluid is restricted or enlarged. Pinch rollers 15, 16 are mounted by means of pins 19 on the outer end of bifurcated bell crank arm 21 pivotally mounted by means of pivot shaft 22, horizontally journalled in frame 23. Pivot shaft 22 is caused to oscillate by means hereinafter described in detail and thereby to open and close the valves. It will be understood that other valve means may be employed in accordance with the present invention, but the heretofore described pinching of the flexible tubing 13, 14 is desirable in that no mechanical structure in the line of flow is required and hence the tendency of such mechanical structure to stick and the sanitation problem involved are eliminated.

Each of the tubes 13, 14 discharges into the casing 26 of the mixer 27 driven by an electric motor (not shown). Mixer 27 discharges into the bottom of test tank 28, it being observed that the entire contents of both lines 13, 14 is discharged into the tank and hence a more accurate reading is obtained than in instances where only a portion of the flow is sampled. Test tank 28 is of sufficient capacity so that an accurate and consistent control of density is attained. The top edge 29 of tank 28 comprises an overflow weir and surrounding and below the level of the weir edge is an overflow trough 31 which catches the fluid flowing over the top of the weir.

Outlet 32 of trough 31 is connected to a pipe 33 which leads to a filler bowl or the like. The present invention provides means to adjust the positions of the pinch rollers 15, 16 or other valve means dependent upon the density of the fluid in the test tank 28 so that the density of the liquid discharged through overflow line 33 is accurately controlled.

Suspended in the test tank 28 is a hydrometer bulb 36 of well-known construction wherein a weight 37 is located in the bottom of the bulb to insure that the bulb rests in vertical position and in which the elevation of the bulb in the fluid is a direct function of the density. Bulb 36 is surrounded by a cage having a ring 38 centrally located by means of a spider 39 so that the bulb may rise and fall freely in a vertical sense but does not travel toward or away from the sides of the test tank 28. Bulb 36 has an upwardly extended elongated stem 41 preferably closed at the top and has fixed adjacent its upper end a magnetic core 42. Magnetic core 42 is located centrally and is vertically slidable relative to the coil 43 of differential transformer 44, the core 42 in effect constituting an armature for the differential transformer so that as the core 42 rises and falls responsive to movement of the hydrometer bulb 36 and in turn, responsive to changes of density of the liquid under test, the flow of electric current through the differential transformer coil 43 is affected. By electrical means hereinafter described in detail and subject to compensations for flow and temperature, differential transformer 44 controls through a suitable amplifier 46, servo-motor 47. Differential transformer 44 is mounted in a vertically slidable cage 51 having vertical spacers 54, there being three such vertical spacers 54 in the form of the invention herein illustrated. Differential transformer 44 is secured to disc 53. Spacers 54 slide through and are held in vertical alignment by top and bottom plates of superstructure 57 fixed to the top of the tank 28. Discs 52, 53 hold spacers 54 in position relative to each other. In order to provide for manual adjustment of the density, various means may be employed. In the form herein shown, two of the vertical spacers 54 have secured thereto racks 58 which mesh with pinions 59 on horizontal shaft 61 journalled in superstructure 57. The outer end of shaft 61 carries a knob 62 adjacent which is a suitably calibrated dial 63. Thus by turning the knob 62 the cage 51 may be raised or lowered. Hence when a syrup of higher density is required the knob 62 is turned in such manner as to raise coil 44 and when a less dense liquid is desired the knob is turned in the opposite direction.

As has heretofore been mentioned, the rate of flow of fluid governs the height of the liquid flowing over the weir 29, and if an accurate control is to be obtained it is desirable that compensation for said variations in the height of fluid be achieved. Accordingly, a weir float 66 is located to float on the surface of the liquid. Float 66 carries an elongated vertical stem 69, the upper end of which has a magnetic core 71 vertically slidable within the coils 72 of weir differential transformer 73. Float 66 is held in position by top and bottom guides 67 for transformer cage 76. Transformer 73 is of the differential type similar in principle to the main transformer 44. Transformer coils 72 are located inside cage 76 and cage 76 is provided with horizontal outwardly extending pins 77. Pins 77 fit in slots 78 in clevis 79 which is pivoted by means of pivot 81 to bracket 82 mounted on superstructure 57. A temperature responsive thin-wall bulb 86 is located in the liquid in tank 28 and connected by means of tube 87 to Sylphon bellows 88. The plunger 89 of bellows 88 is connected by means of pin 91 to clevis 79. Thus variations in temperature cause expansion and contraction of bellows 88 and cause cage 76 to rise and fall. Extension spring 92 is attached by means of pin 93 to clevis 79 and anchor screw 94 which is threaded through superstructure 57. Spring 92 serves to pre-load bellows 88.

Servo-motor 47 is mounted in superstructure 57 and its shaft 101 carries pinion 102 which meshes with gear 103 on countershaft 104 in gear box 106. Countershaft 104 carries a second pinion 107 which meshes with the second gear 108 on second countershaft 109. Second countershaft 109 likewise carries a pinion 111 which meshes with gear 112 on the pivot shaft 22 of the bell cranks 21. Accordingly, as servomotor 47 turns in one direction or the other, by means of a suitable gear reduction the pincher rollers 15, 16 are moved toward or away from one or the other of the flexible tubes 13, 14, thereby adjusting the flow through the tubes.

Turning now to the wiring diagram of FIG. 6, it will be seen that the main differential transformer 44, which is responsive to the elevation of the hydrometer bulb 36, and the second differential transformer 73, which is responsive to the float level 66, are connected through potentiometer 116 and then through servoamplifier 46 to servomotor 47. Adjustment of potentiometer 116 may be made to control the voltage per unit of displacement of transformer 73 to match that of transformer 44.

What is claimed is:

1. Density control apparatus comprising a tank, at least two fluid lines discharging into said tank conveying into said tank fluids of different densities and wherein the density of the combined fluid in said tank is dependent upon the relative flow through said lines, a hydrometer suspended in the combined fluid in said tank, an armature on the upper end of said hydrometer and responsive to density of said combined fluid, a differential transformer surrounding said armature and energized responsive to the position of said armature, valve means for adjusting the flow through at least one of said fluid lines, a servomotor controlled by said differential transformer for proportionately adjusting said valve means to maintain the density of said combined fluid at a pre-selected level and manually adjustable means for adjusting said armature and differential transformer relative to each other to alter the density of said combined fluids.

2. Density control apparatus comprising a tank, at least two fluid lines discharging into said tank conveying into said tank fluids of different densities and wherein the density of the combined fluid in said tank is dependent upon the relative flow through said lines, a hydrometer suspended in the combined fluid in said tank, first means movable with said hydrometer and responsive to density of said combined fluid, first electrical means energized responsive to the position of said first means, second means responsive to rate of flow of fluid through said tank, second electrical means energized responsive to the position of said first means, third means for combining the output of said first and second electrical means to compensate for variations in the position of said hydrometer dependent on rate of flow, valve means for adjusting the flow through at least one of said fluid lines, and fourth means actuated by said third means for adjusting said valve means to maintain the density of said combined fluid at a pre-selected level.

3. Density control apparatus comprising a tank, at least two fluid lines discharging into said tank conveying into said tank fluids of different densities and wherein the density of the combined fluid in said tank is dependent upon the relative flow through said lines, a hydrometer suspended in the combined fluid in said tank, first means movable with said hydrometer and responsive to density of said combined fluid, temperature responsive means responsive to temperature of said combined fluid, electrical means energized by said first means and said temperature responsive means proportionately responsive both to said density and to said temperature to compensate for temperature effects upon the functioning of said hydrometer, valve means for adjusting the flow through at least one of said fluid lines, and second means actuated by said electrical means for adjusting said valve means to maintain the density of said combined fluid at a pre-selected level and compensate for temperature variations of said combined fluid.

4. Density control apparatus comprising a tank, at least two fluid lines discharging into said tank conveying into said tank fluids of different densities and wherein the density of the combined fluid in said tank is dependent upon the relative flow through said lines, a hydrometer suspended in the combined fluid in said tank, an armature fixed for movement with said hydrometer and responsive to density of said combined fluid, electrical means energized responsive to the position of said armature, valve means for adjusting the flow through at least one of said fluid lines, and a servomotor movable through an infinite number of positions actuated by said electrical means for proportionately adjusting said valve means to maintain the density of said combined fluid at a pre-selected level.

5. Density control apparatus comprising a tank, at least two fluid lines discharging into said tank conveying into said tank fluids of different densities and wherein the density of the combined fluid in said tank is dependent upon the relative flow through said lines, a hydrometer suspended in the combined fluid in said tank, an armature fixed for movement with said hydrometer and responsive to density of said combined fluid, a differential transformer to receive said armature for slidable movement therein and energized responsive to the position of said armature relative to said transformer, the output of said transformer being variable through an infinite range, valve means for adjusting the flow through at least one of said fluid lines, and a servomotor actuated by said differential transformer for proportionately adjusting said valve means dependent upon said output to maintain the density of said combined fluid at a pre-selected level and compensate for temperature variations of said combined fluid.

6. Apparatus according to claim 5, which further comprises manually adjustable means for adjusting the elevation of said differential transformer to alter the density of said combined fluid.

7. Density control apparatus comprising a tank, at least two fluid lines discharging into said tank conveying into said tank fluids of different densities and wherein the density of the combined fluid in said tank is dependent upon the relative flow through said lines, an outlet for said tank, a hydrometer suspended in the combined fluid in said tank, an armature fixed for movement with said hydrometer and responsive to density of said combined fluid, a differential transformer to receive said armature for slidable movement therein and energized responsive to the position of said armature relative to said transformer, means responsive to rate of flow of fluid through said tank, electrical means energized responsive to the position of said last-mentioned means, second electrical means for combining the output of said differential transformer and of said electrical means to compensate for variations in the position of said hydrometer dependent on rate of flow, valve means for adjusting the flow through at least one of said fluid lines, and a servomotor actuated by said second electrical means for adjusting said valve means to maintain the density of said combined fluid at a pre-selected level.

8. Density control apparatus comprising a tank, at least two fluid lines discharging into said tank conveying into said tank fluids of different densities and wherein the density of the combined fluid in said tank is dependent upon the relative flow through said lines, a hydrometer suspended in the combined fluid in said tank, an armature fixed for movement with said hydrometer and responsive to density of said combined fluid, a differential transformer to receive said armature for slidable movement therein and energized responsive to the position of said armature relative to said transformer, temperature responsive means responsive to temperature of said combined fluid, temperature compensating means for compensating the output of said differential transformer proportionately dependent on said temperature responsive means, valve means for adjusting the flow through at least one of said fluid lines, and a servomotor actuated by said transformer and said temperature compensating means for adjusting said valve means to maintain the density of said combined fluid at a pre-selected level and compensate for temperature variations of said combined fluid.

9. Density control apparatus comprising a tank, at least two fluid lines discharging into said tank conveying into said tank fluids of different densities and wherein the density of the combined fluid in said tank is dependent upon the relative flow through said lines, a hydrometer suspended in the combined fluid in said tank, an armature fixed for movement with said hydrometer and responsive to density of said combined fluid, a differential transformer to receive said armature for slidable movement therein and energized responsive to the position of said armature relative to said transformer, said tank having an overflow weir, a float at said weir dependent on the rate of flow of fluid through said tank, a second armature fixed for movement with said float, a second differential transformer to receive said second armature for slidable movement therein and energized responsive to said rate of flow, electrical means for combining the output of said differential transformers to compensate for variations in the position of said hydrometer dependent on rate of flow, valve means for adjusting the flow through at least one of said fluid lines, and a servomotor actuated by said electrical means for adjusting said valve means to maintain the density of said combined fluid at a pre-selected level.

10. Apparatus according to claim 9, which further comprises temperature responsive means in said combined fluid, and means actuated by said temperature responsive means for moving said second differential transformer dependent on temperature of said combined fluid.

11. Apparatus according to claim 9, which further comprises an adjustment knob and means actuated by said knob for raising and lowering one of said differential transformers.

12. Density control apparatus comprising a tank, at least two fluid lines discharging into said tank conveying into said tank fluids of different densities and wherein the density of the combined fluid in said tank is dependent upon the relative flow through said lines, a hydrometer suspended in the combined fluid in said tank, an armature fixed for movement with said hydrometer and responsive to density of said combined fluid, a differential transformer to receive said armature for slidable movement therein and energized responsive to the position of said armature relative to said transformer, said tank having an overflow weir, a float at said weir dependent on the rate of flow of fluid through said tank, first means for compensating the output of said differential transformer dependent on the position of said float, valve means for adjusting the flow through at least one of said fluid lines, and a servomotor actuated by the output of said differential transformer as compensated by said first means for adjusting said valve means to maintain the density of said combined fluid at a pre-selected level.

13. Density control apparatus comprising a tank, a first and a second tube having, respectively, a first and a second compressible means for varying flow through said tubes, both said tubes discharging into said tank conveying into said tank fluids of different densities and wherein the density of the combined fluid in said tank is dependent upon the relative flow through said tubes, first and second means for compressing said first and second compressible means, respectively, to restrict flow through said tubes, a hydrometer suspended in the combined fluid in said tank, third means movable with said hydrometer and responsive to density of said combined fluid, electrical means energized responsive to the position of said third means, and fourth means actuated by said electrical means for actuating said first and second means oppositely to maintain the density of said combined fluid at a pre-selected level.

14. Density control apparatus comprising a tank, a first and a second tube having, respectively, a first and a second compressible means for varying flow through said tubes, both said tubes discharging into said tank conveying into said tank fluids of different densities and wherein the density of the combined fluid in said tank is dependent upon the relative flow through said tubes, first and second means for compressing said first and second compressible means, respectively, to restrict flow through said tubes, a hydrometer suspended in the combined fluid in said tank, an armature fixed for movement with said hydrometer and responsive to density of said combined fluid, a differential transformer to receive said armature for slidable movement therein and energized responsive to the position of said armature relative to said transformer, a servomotor actuated by said differential transformer, and third means actuated by said servomotor for actuating said first and second means oppositely to maintain the density of said combined fluid at a pre-selected level.

15. Density controlled apparatus comprising a tank, at least two fluid lines discharging into said tank, conveying into said tank fluids of different densities, and wherein the density of the combined fluid in said tank is dependent upon the relative flow through said lines, an outlet for said tank, a hydrometer suspended in the combined fluid in said tank, an armature fixed for movement with said hydrometer and responsive to density of said combined fluid, a differential transformer to receive said armature for slidable movement therein and energized responsive to position of said armature relative to said transformer, means responsive to rate of flow of fluid through said tank varying the output of said transformer to compensate for variations in the positions of said hydrometer dependent on rate of flow, valve means for adjusting the flow through at least one of said fluid lines, and a servomotor actuated by said first-mentioned means for adjusting said valve means to maintain the density of said combined fluid at a pre-selected level.

16. Density control apparatus comprising a tank, at least two fluid lines discharging into said tank, conveying into said tank fluids of different densities and wherein the density of the combined fluid in said tank is dependent upon the relative flow through said lines, a hydrometer suspended in the combined fluid in said tank, an armature on the upper end of said hydrometer and responsive to density of said combined fluid, a differential transformer surrounding said armature and energized responsive to the position of said armature, valve means for adjusting the flow through at least one of said fluid lines, a servomotor controlled by said differential transformer for proportionately adjusting said valve means to maintain the density of said combined fluid at a pre-selected density, and level sensing means responsive to the level of fluid in said tank, said valve means being additionally adjusted responsive to said level sensing means.

17. Density control apparatus comprising a tank, at least two fluid lines discharging into said tank, conveying into said tank fluids of different densities and wherein the density of the combined fluid in said tank is dependent upon the relative flow through said lines, a hydrometer suspended in the combined fluid in said tank, an armature on the upper end of said hydrometer and responsive to density of said combined fluid, a differential transformer surrounding said armature and energized responsive to the position of said armature, valve means for adjusting the flow through at least one of said fluid lines, a servomotor controlled by said differential transformer for proportionally adjusting said valve means to maintain the density of said combined fluid at a pre-selected density, and temperature sensing means responsive to temperature of fluid in said tank, said valve means being additionally adjusted responsive to said temperature sensing means.

References Cited in the file of this patent

UNITED STATES PATENTS

| 1,892,839 | Howard | Jan. 3, 1933 |
| 2,120,048 | Turner | June 7, 1938 |
| 2,258,360 | Hetzer | Oct. 7, 1941 |
| 2,326,475 | Matthews | Aug. 10, 1943 |
| 2,388,669 | Baker | Nov. 13, 1945 |
| 2,543,522 | Cohen | Feb. 27, 1951 |
| 2,757,326 | Boundy | July 31, 1956 |

FOREIGN PATENTS

| F12854 III 64/C | Germany | July 5, 1956 |